Dec. 20, 1966 R. L. WISEMAN 3,292,505
ART OF INTERCEPTING SPACED GROUPS OF FLAT OVERLAPPING BOOKS
Filed Feb. 21, 1964 3 Sheets-Sheet 1

INVENTOR.
RAYMOND L. WISEMAN
BY
Arthur Robert
ATTORNEY

Dec. 20, 1966    R. L. WISEMAN    3,292,505
ART OF INTERCEPTING SPACED GROUPS OF FLAT OVERLAPPING BOOKS
Filed Feb. 21, 1964    3 Sheets-Sheet 2
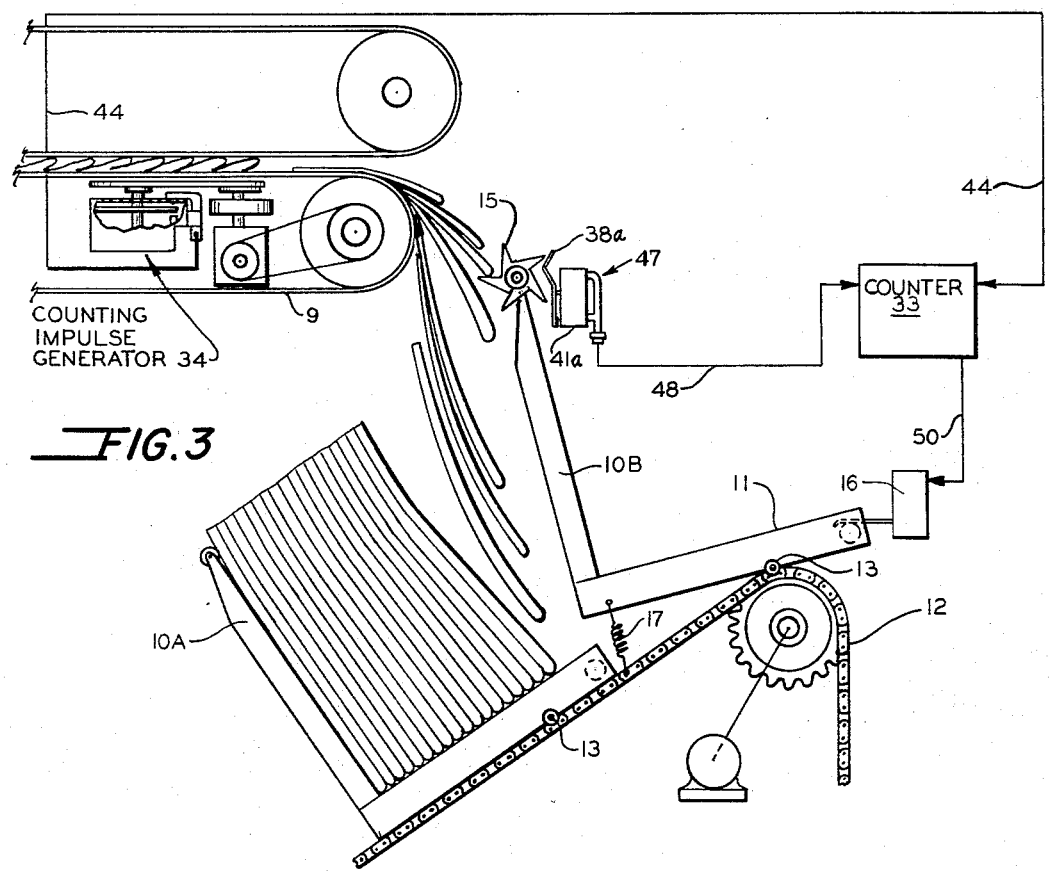
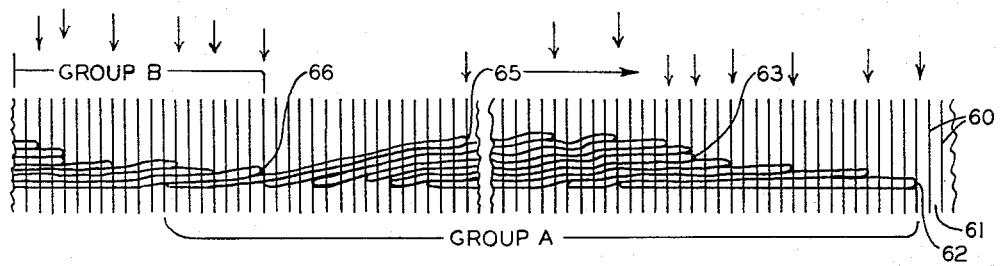
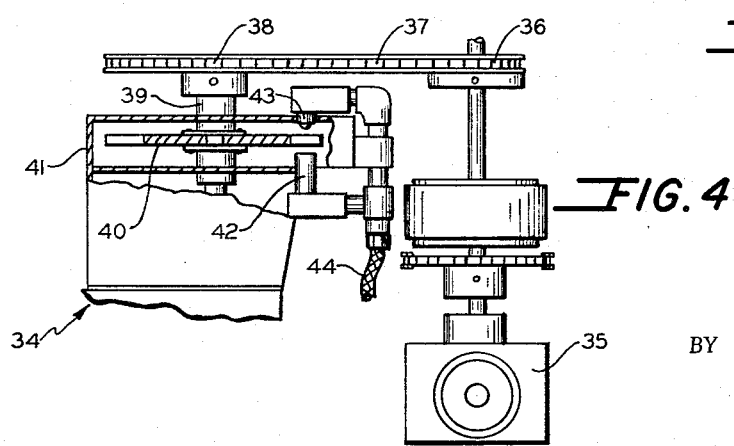
INVENTOR.
RAYMOND L. WISEMAN
BY
Arthur Robert
ATTORNEY Dec. 20, 1966  R. L. WISEMAN  3,292,505
ART OF INTERCEPTING SPACED GROUPS OF FLAT OVERLAPPING BOOKS
Filed Feb. 21, 1964  3 Sheets-Sheet 3
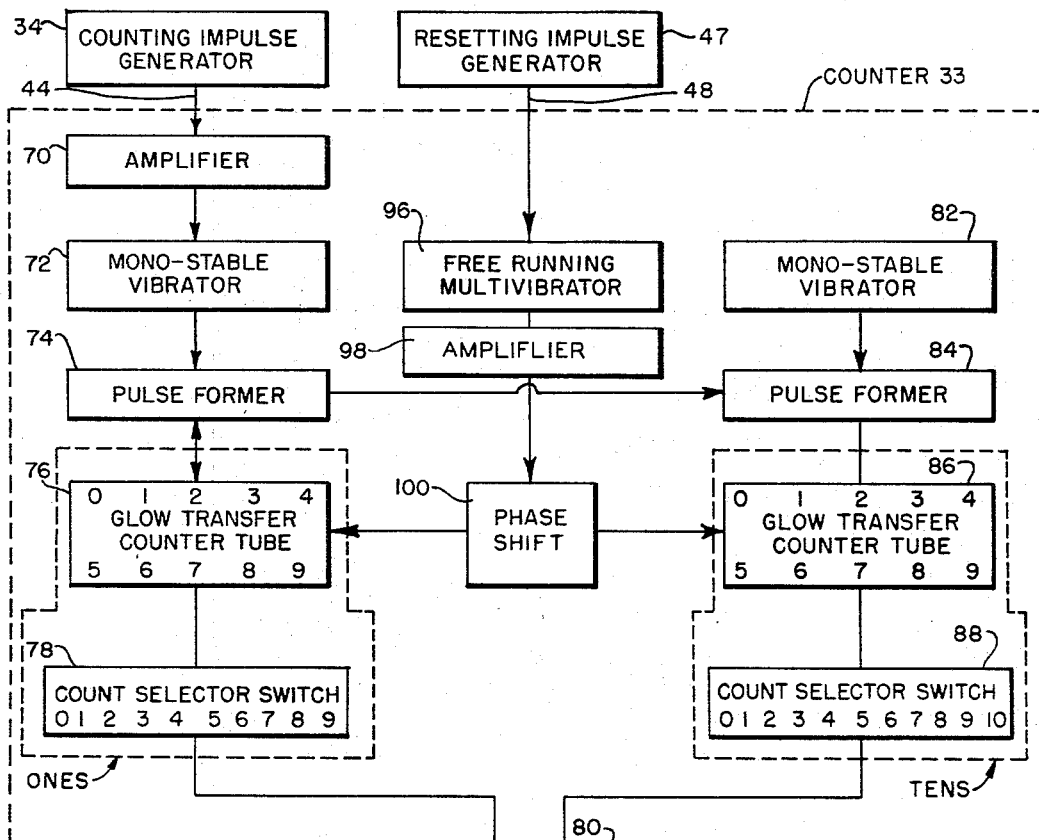
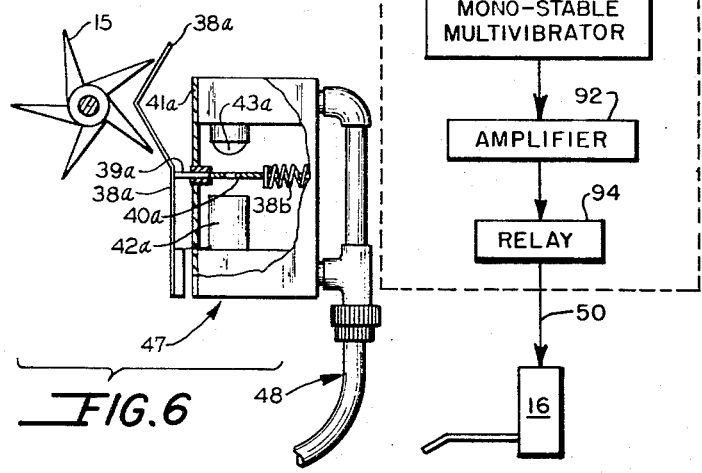
FIG. 7
FIG. 6
INVENTOR.
RAYMOND L. WISEMAN
BY
Arthur H. Robert
ATTORNEY

United States Patent Office 3,292,505
Patented Dec. 20, 1966

3,292,505
ART OF INTERCEPTING SPACED GROUPS OF FLAT OVERLAPPING BOOKS
Raymond L. Wiseman, 724 Waterford Road, Louisville, Ky. 40207
Filed Feb. 21, 1964, Ser. No. 346,493
5 Claims. (Cl. 93—93)

In high speed printing press installations, it is common practice to manufacture rotogravure magazines or "books" (at the rate of 30,000 to 60,000 per hour) by (1) printing wide webs of paper on both sides, (2) cutting these wide webs longitudinally into elongate narrow strips, which have a width equal to the top-to-bottom dimension of the magazine; (3) feeding the several strips into overlapping relationship; (4) cutting the overlapped strips transversely into magazine-forming segments, which have a length equal to the open width of two magazine pages; (5) folding each cut segment along a transversely-extending fold line to form one magazine; (6) guiding successive folded magazines into successive pockets of a fan wheel, which lays them down or drops them on and thus transfers them to an outgoing underlying stream conveyor in a manner such as to form a stream of overlapping magazines with their fold lines foremost and spaced at say 2″ intervals; (7) conveying the stream to a delivery point in the mail or distribution room; and (8) forming successive groups of magazines into successive bundles ready for distribution by (a) removing the magazines sequentially from the conveyor at the delivery point, (b) intercepting one sequence of a predetermined number of magazines as they flow from the conveyor and directing its magazines one upon the other to form a "counted" stack, i.e. a stack containing said predetermined number of magazines, (c) successively intercepting subsequent sequences of the same number of magazines and similarly directing their magazines to form other counted stacks and (d) successively removing and wrapping, tying or otherwise bundling each counted stack for distribution purposes.

Where the magazine sequences or groups are to be manually intercepted and removed at the delivery point, it is desirable to separate the overlapping magazines on the conveyor system into accurately counted groups or otherwise indicate where one accurately counted group ends and another begins. This can be best accomplished at the fan wheel laydown. For example, in U.S. Patent #2,555,281, Whitehead et al. operatively associate and synchronize a magazine interceptor with the fan wheel or fly for the purpose of intercepting the first magazine of each counted sequence or group and slowing it down long enough to delay the transfer of the first few magazines thereof and thereby effect a substantial increase in the fold spacing between the last magazine of the preceding group and the first magazine of the succeeding group. In this way, the "in-group" spacing (i.e. the spacing between the folds of successive magazines within each group) may be of one order, say, averaging 2″ and normally being not less than 0″ nor more than 4″, while the "between-group" spacing (i.e. the spacing between the folds of the last magazine in one group and that of the first magazine in the next group) may be of comparatively large order, say, averaging 10″ and normally being no less than 8″ nor more than 12″.

Where the group interception is to be accomplished mechanically at the delivery point, it has been proposed to control the operation of the mechanical interceptor by means of a mechanical counter which functions to count the magazines approaching the delivery point and to actuate the interceptor when that count corresponds to the number of magazines desired in the counted sequence or stack. Thus, for example, where counted stacks containing 25 magazines are being formed, the counter becomes operative after it has counted 25 magazines (and multiples thereof) to actuate the interceptor in a manner causing it to intercept the 26th magazine, and the 51st, etc.).

Unfortunately, not all magazines are sufficiently spaced either to be counted wherever the counting operation is performed or to be intercepted at the delivery point. For example, assume that a 2″ fold spacing is desired between successive magazines as they are carried by the conveyor system in overlapped relationship from the fan wheel laydown to the point of sequence interception. The fold spacing actually secured at the laydown may well average 2″ but it will normally vary from 0″ to 4″ due to various causes including (a) the normal lack of precise control of spacing at the fan wheel laydown, (b) the haphazard slippage of magazines in transit on the conveyor system and (c) the failure of the conveyor system to track the press speeds precisely. If zero fold spacing prevails between two successive magazines when they pass the counter, the latter will count one magazine but fail to count the other. This failure to count will also occur where the folds are spaced but the spacing is to small to permit actuation of the counter by both magazines.

Where the fold spacing is too small, the counter fails because it can't reach one magazine while the interceptor fails because it doesn't have sufficient time for its operation. For example, at 60,000 magazines per hour, a 2″ fold spacing provides a time interval of .060 second between successive magazines. During this time interval, the last magazine must be detected, counted as last in a sequence, a circuit closed to actuate the interceptor and the interceptor must then complete its intercepting movement. These operations are sequential; hence, the times are cummulative. Where the fold spacing is too small, the interceptor fails to make a timely interception simply because there isn't sufficient time for proper interception.

The principal object of the present invention is to provide a novel method of and means for intercepting the first magazine of each of a succession of counted sequences mechanically, consistently and accurately despite normal variations in the fold spacings of such sequences.

Another important object of the present invention is to provide a novel method of and means for effecting sequence interception mechanically in a way which does not require or depend upon the accurate detection or counting or each magazine in each sequence as the conveyor system carries it toward the delivery point.

Another important object is to accomplish the foregoing objects by a method which does not require the extensive modification of known equipment or the use of newly designed special equipment but which may be practiced by known equipment with no more than minor modifications.

All of the objects of my invention cay be easily and simply accomplished by a method comprising: conveying a stream of overlapping magazines in spaced accurately-counted groups having small in-group fold spacings and relatively large between-group fold spacings; operating a counting device to count consecutively, preferably in accordance with the speed of said stream conveyor; resetting that counter in accordance with the size of successive fold spacings so as to restrict said count to small values for said small in-group fold spacings, and to large values for said large between-group fold spacings; and intercepting the first paper of each group in response to said counts of an intermediate value ranging between the maximum of the in-group counts and the minimum of the between-group counts.

Likewise, all of the objects of my invention may be easily and simply accomplished mechanically by means comprising: a stream conveyor system for conveying a stream of overlapping magazines from the fly wheel laydown and for delivering said stream at a delivery point in counted groups having small in-group fold spacings and larger between-group fold spacings; counting means operative to count at a frequency fast enough to provide small and large counts as the stream travels over distances corresponding to said small in-group and larger between-group fold spacings, respectively; reset means for restricting the operation of the counting means to small counts in response to in-group fold spacings and to large counts in response to between-group fold spacings; and means, operating in response to each intermediate count, to intercept the corresponding group as it reaches the delivery point and separate it from the immediately preceding group.

In this arrangement, the counter merely counts consecutive numbers at a desired frequency, which preferably is controlled by and varies directly with the speed of the stream conveyor system. While the reset means is repeatedly actuated by the folds of successive magazines, it does not count the magazines but merely measures the sizes of the in-group fold spacings in terms of small counts and of the between-group fold spacings in terms of large counts. Consequently, so long as it is measuring in-group fold spacings, it resets the counter before the counter can actuate the intercepting means. On the other hand, when it measures a between-group fold spacing, it permits the counter to actuate the intercepting means before it resets the counter.

The invention is illustrated in the accompanying drawings wherein:

FIG. 1 indicates the flow of magazines from the printing apparatus through the folding mechanism and combines that showing with a schematic view of the apparatus involved in forming an overlapping stream of magazines at the laydown, conveying that stream to a delivery point in the mail or distribution room and separating it into stacks;

FIG. 3 is an enlarged view of the apparatus involved in separating that stream into stacks or bundles at the delivery end of the stream conveyor;

FIG. 4 is a partly broken view of a pulse generator for the counting pulses;

FIG. 5 illustrates the relationship between the counting pulse frequency, the reset pulse frequency, the speed of the stream conveyor and the size of the in-group and between-group fold spacings;

FIG. 6 is a somewhat schematic view illustrating the components of the resetting impulse generator 47; and FIG. 7 is a block diagram illustrating the components of an impulse counter of the reset type.

CONVENTIONAL STRUCTURE

Formation of magazines

Figure 1:
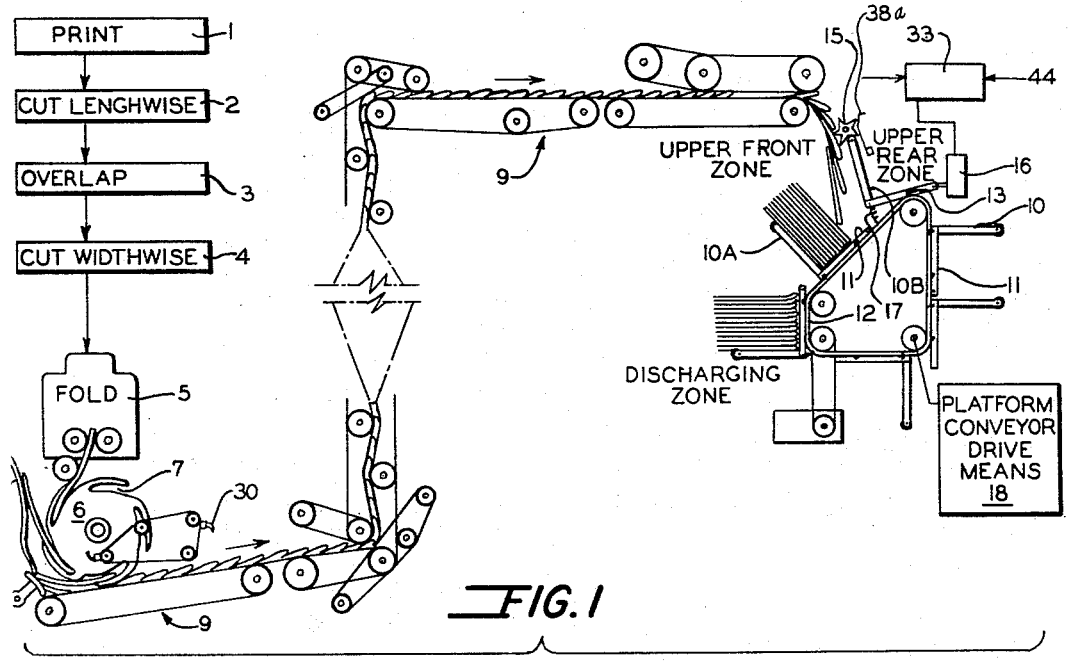

In the rotogravure magazine manufacturing system shown in FIG. 1, a wide web of paper is printed on both sides at 1 and longitudinally cut at 2 into elongate narrow strips which have a "width" equal to the top-to-bottom dimension of the magazine. These strips are fed at 3 into overlapping relationship and the overlapped strips are transversely cut at 4 into magazine sections, which have a "length" equal to the "open width" of two magazine pages. Each magazine section is folded at 5 to form one magazine. A succession of folded magazines thus issues from the delivery roll at 5.

Magazine laydown

This succession of folded magazines is fed to a fan wheel 6, which has a succession of five equally-spaced pockets 7 on its periphery, the mouth of each pocket opening rearwardly, i.e. in a direction opposite to the direction of rotation. The rate of fan wheel rotation is synchronized with the flow of magazines issuing from the folding machine 5, the arrangement being such that the fold of one magazine is forced forwardly into one pocket 7 of the fan wheel while the fold of the next magazine is forced into the next pocket, and so on. As a consequence, each magazine in the fan wheel travels with its fold foremost.

Figure 2:
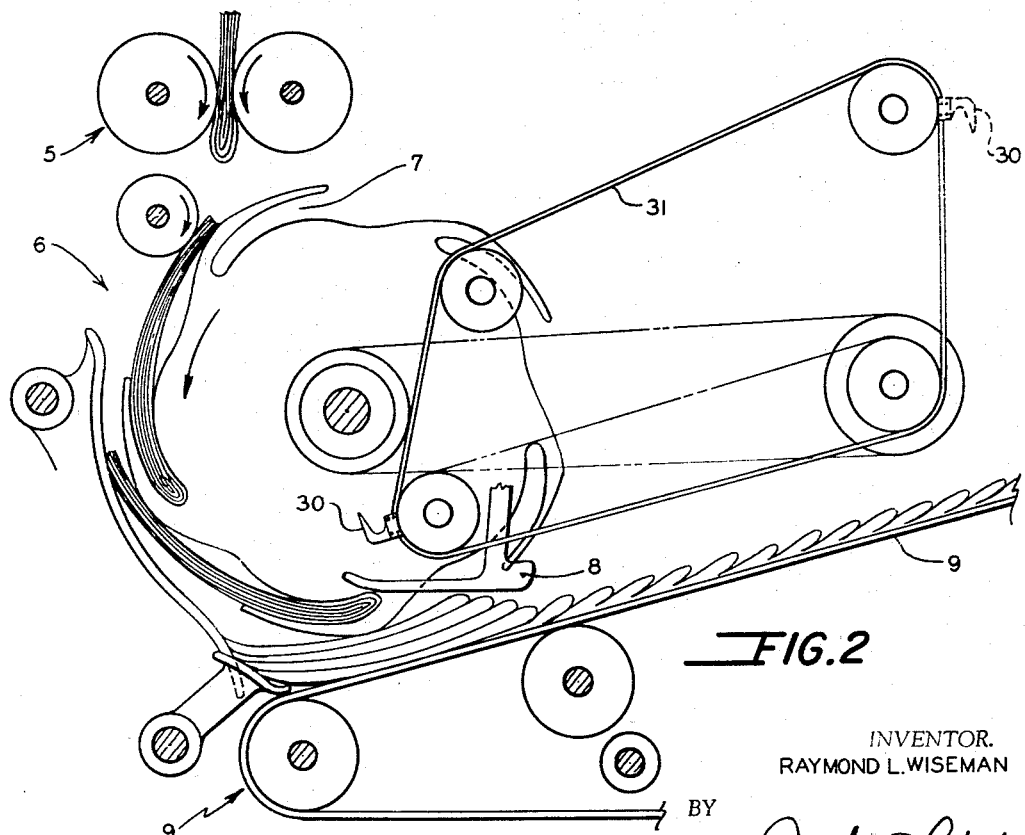
FIG. 2 is an enlarged view of the laydown apparatus involved in forming the magazine into an overlapping stream.

A stationary stripper 8 (see FIG. 2) strips the magazines from the fan wheel and thus causes the wheel to drop or "lay down" these magazines successively on the receiving conveyor of a conveyor system 9.

Magazines conveyed to distribution room

The stream conveyor system 9 extends from the fan wheel laydown to a delivery point in the mail or distribution room. The speed of the conveyor system is synchronized with the printing press in a manner such that successive magazines are laid down upon the receiving conveyor with their fold lines not only foremost but also spaced, say 2" apart.

When the stream conveyor system 9 delivers this stream of overlapped magazines to the delivery point in the mail or distribution room, the fold lines should be spaced 2" apart. However, as heretofore noted, such spacings may average 2" but, due to various causes, they will normally vary over a range extending from 0" spacing to 4" spacing. At the delivery point, the magazines are successively discharged from the conveyor system 9 and simultaneously delivered to a stacking machine.

Stacking and bundling the magazines

The stacking machine, which is positioned to receive the stream of overlapping magazines flowing from the conveyor system 9, functions to intercept the first magazine of a given counted group, stack the magazines of that group and then intercept the first magazines of the next group so as to separate the intercepted group from the immediately preceding group, which is immediately removed from the stacking zone. The stacking machine is the first mechanism in a train for stacking the magazines and wrapping, tying or otherwise packaging each stack into a unitary bundle.

The stacking machine, as it is conventionally constructed and operated, comprises: (A) An endless succession of L-shaped platforms, (1) each having a foot 10 and a leg 11; (B) an endless platform conveyor 12, having upper and lower runs, (1) said upper run declining forwardly through an upper front zone located in the path of said discharging stream to a lower discharging zone, and (2) said lower run returning from said lower zone to an upper rear zone adjacent the rear side of said front zone; (C) mounting means, including one pivotal axis 13 for the mid-portion of the leg 11 of each platform, mounting each of said endless succession of platforms upon said platform conveyor 12 (1) for translational movement bodily with the conveyor (a) from a receiving position in said upper front zone, in which one platform, individually designated 10A, is positioned to receive a stack-forming group of magazines, to a discharging position in said lower zone, in which said platforms discharge their respective stacks, and (b) from said discharging position toward a ready position in said upper rear zone, in which one platform, individually designated 10B, stands ready to move through said stream of magazines into its receiving position in said upper front zone, and (2) for tilting movement relative to the platform conveyor 12 in the upper rear zone from its normal mounted position on the platform conveyor pivotally rearward about axis 13 to a rearwardly tilted ready position in which its foot 10 stands adjacent the rear side of the magazine stream discharging into the preceding platform 10A so that, when the ready platform 10B is swung forwardly back into its normally mounted position on the conveyor, its foot will swing forwardly through the magazine stream to intercept said stream; (D) a latch 14 (see FIG. 4) for releasably holding a rearwardly tilted platform 10B in its ready position; (E) a star wheel 15 located along said magazine discharging stream in position to be actuated by folds of successive magazines with successive rest periods between actuations corresponding in duration to the spacing between successive folds; (F) latch release means 16, operating, in response to a predetermined number of star wheel actuations, to unlatch a tilted platform 10B in the ready position; (G) bias means 17 operative, when said tilted platform is unlatched, to snap it into its operative position; and (H) conveyor drive means 18 (see FIG. 1) operative, contemporaneously with said latch release means 16, to move said platform conveyor 12 until the next platform is tilted in its ready position and then latched therein.

It will be understood that the movement of the platform conveyor 12 stops when a ready platform 10B stands cocked in its ready position. At that time, the preceding platform 10A presents an upwardly-open V-shaped pocket in which the platform leg 11 declines forwardly downward along the upper forwardly declining run of the platform conveyor 12 while the platform foot 10 inclines forwardly upward from the lower end of the leg 11 and more or less at a right angle to the platform conveyor 12. The depth of this V-shaped pocket can be varied by adjusting the position of the foot 10 along the leg 11 as indicated in FIG. 3. The magazines discharging from the stream conveyor system 9 are stacked one over the other upon the forwardly inclined platform foot 10 with their respective folds engaging the forwardly declined platform leg 11.

In the meantime, the fold of each available magazine in the discharge stream, engages the star wheel 15 which functions to count the magazines. If the magazines are being stacked in groups of 25, the latch release means 16 becomes operative after 25 actuations of the star wheel (and after actuations amounting to multiples of 25) to unlatch a cocked or tilted platform 10B in its ready position. The bias means 17 is now instantly operative automatically to snap the tilted platform 10B forwardly about its pivotal axis 13 into its operative magazine receiving position. As a consequence, the foot of the platform 10B swings through the discharging stream in time to intercept the magazine corresponding to the 26th count (or the 51st or 76th, etc.) while the platform conveyor drive means 18 becomes contemporaneously operative to start the platform conveyor 12 and to move all platforms 10 along their endless path until the next following platform is moved into the upper rear zone, tilted into its ready position against the opposition of bias means 17 and then latched therein. All of the operations of the stacking machine, beginning with the unlatching of one platform and the latching of the next following platform, are performed quite rapidly; in fact, in less time than the stream conveyor system 9 requires to discharge one counted group of magazines. At the 60,000 rate, the stream conveyor system discharges 25 magazines during each 1½ seconds.

It will be appreciated, however, that if the folds of two magazines pass the star wheel at the same time, only one star wheel actuation will occur; hence, one magazine will not be counted and the group of magazines then being stacked will contain at least 26 magazines instead of 25.

THE INVENTION

In carrying out my invention, at least four things are accomplished, viz: (1) the first magazine of each group is intercepted at the magazine lay-down long enough to delay the transfer or lay-down of the first few magazines of a counted group and, after the transfer is effected, the initial conveyed speed of those magazines is reduced over a short distance, the transfer delay and the speed reduction thereby cooperatively effecting an increase in the fold spacings between successive counted groups sufficient to render each such between-group fold spacing greater than the maximum in-group fold spacing normally encountered; (2) a counter is used to count at a frequency fast enough to provide a small count within the time it takes the magazine stream to travel over the short distances, which correspond to its in-group fold spacings, and a large count within the time it takes the stream to travel over the longer distances, which correspond to the between-group fold spacings; (3) the star wheel 15 is used to measure each available fold spacing and to reset the counter at the end of each such measurement and thereby restrict the operation of the counter to small counts when the star wheel measures the small in-group fold spacings and to large counts when it measures the large between-group fold spacings; and (4) means, operating in response to each intermediate count, to intercept the stream of magazines at the corresponding between-group spacing responsible for the large count.

The method of and the means for performing the operations of (1) intercepting the magazines at the laydown, (2) counting consecutive numbers, (3) resetting the counter in accordance with the size of the magazine fold spacing and (4) intercepting and stacking the magazines at the delivery point, will next be described.

Interception at magazine laydown

At the outset it should be understood that the fan wheel 6 is composed of a series of axially-spaced disc-like members mounted on a suitable shaft and arranged to present strippers 8 between certain pairs of discs forming the wheel and unobstructed space between other pairs thereof.

In accordance with my invention, interceptors in the form of a suitable number of hooks 30 are mounted on an endless chain 31 for movement into the unobstructed space between one pair of fan wheel discs at a rate of lineal speed lower than the lineal speed of the fan wheel 6 but so synchronized therewith that the first hook 30 will intercept the first magazine of each counted group long enough to delay the transfer of the first two or three magazines of that group. At least two axially spaced interceptors composed of hooks 30 and belts 31, are provided. If the in-group fold laydown spacing, when it is neither delayed nor restricted, approximates or averages 2", a delay in the first two magazines would provide a maximum between-group spacing of 4" which is no greater than the maximum in-group fold spacing that may be encountered in actual operation. A between-group spacing of this size is not sufficient to carry out my invention in the highly accurate and efficient manner which I prefer.

Since the number of magazines which may thus be intercepted and delayed during the laydown is limited, and since the lineal speed of the conveyors of stream conveyor system 9 is the same as the fan wheel 6, I propose to have the slower-moving laydown interceptor hooks 30 travel along the initial portion of the faster-moving conveyor 9 to effect a reduction in the speed with which the magazines controlled by hook 30 would otherwise travel. This reduction in speed is carried out over a distance long enough to insure the production of between-group fold spacings having a minimum value substantially greater than the maximum of the in-group fold spacings.

Where the maximum in-group fold spacing is 4", the minimum between-group fold spacing may be as low as 6", which involves a delay of the first three magazines of each group but I prefer to have it larger. I have obtained good results with a between-group fold spacing averaging 10" and varying from 8" to 12". This involves a delay of the first five magazines of each group. I have also successfully employed the present invention with higher between-group fold spacings; hence, provide for spacings ranging as high as 20".

The interception of the magazines at the laydown has the advantage of providing an easy and entirely satisfactory way of producing a stream of accurately counted spaced groups of overlapping magazines on the conveyor system 9. The restriction of the speed, at which these magazines travel along the initial portion of the conveyor system, provides an easy way of increasing the between-group spacing to a magnitude which may be termed foolproof because it gives ample opportunity for the separation of these spaced groups into separate stacks at the delivery end of the conveyor.

Counting consecutive numbers

Any form of resettable counter 33 may be employed so long as it can be operated to count at a frequency fast enough to provide a small count within the time it takes the magazine stream to travel over the short and long distances respectively corresponding to in-group and between-group fold spacings. I prefer, however, to relate the frequency of the count to (and make it vary with) the speed of the press. Accordingly, I provide the arrangement shown in FIGS. 3 and 4 wherein the press (not shown) is mechanically connected, through the conveyor system 9, to the input end of an electrical pulse transmitter 34.

As shown in FIG. 3, the press is connected to the input end of a variable speed gear box 35. As shown in FIG. 4, the output end of gear box 35 drives a train of mechanism (comprising sprocket 36, which is connected through chain 37 to sprocket 38 on shaft 39) to rotate a slotted disc 40 within a housing 41. A light source 42 arranged on one side of the slotted disc 40 and a photocell 43 on the opposite side cooperate with each other and with disc 39 to set up, in control pulse cable 44, a succession of electrical pulses at a frequency which varies directly with the press speed and which equal the speed of disc rotation multiplied by the number of slots in the disc 40.

As indicated in FIG. 3, the pulses passing from photocell 43 through control pulse cable 44, are used to actuate counter 33. In this connection, I have obtained excellent results with a pulse rate averaging one pulse for each ½″ of conveyor travel. In other words, if we assume that the counter 33 is at zero, then upon each ½″ of conveyor travel the counter will be actuated once by the pulse generator 34 through line 44. Consequently, at the end of 1″ of travel, the counter 33 will establish a count of 2, at 2″ of travel the count will be 4, etc. In other words, the count will continue to increase progressively or consecutively until the counter is reset to zero. It will, of course, be understood that this pulse rate may be increased very substantially but the extent to which it can be decreased from this ½″ rate is obviously limited.

Resetting the counter in accordance with fold spacings

The star wheel 15, as in the previously described conventional system, is always located in the magazine stream (discharging from stream conveyor 9) in position to be engaged by the fold of each available or accessible magazine in the discharge stream. It is actuated once through each such engagement. When actuated, it functions in accordance with my invention, to reset the counter 33 to zero. This is accomplished by providing another pulse generating system 47, which in some cases may be (but is not assumed to be) identical to the counting pulse generating system 34, connecting its input end mechanically to star wheel 15 so that it generates one pulse upon each star wheel actuation and feeding its output pulse through cable 48 to counter 33 to actuate the reset means of counter 33.

The star wheel 15, which moves ⅕ of a revolution each time it is actuated, is intermittently actuated at a rapid rate. As indicated in FIG. 6, it cooperates with outwardly biased detent spring 38a and coil spring 38b to reciprocate shaft 39a and slotted disc 40a in housing 41a at a correspondingly rapid rate. A light source 42a arranged on one side of the slotted disc 40a and a photocell 43a on the opposite side thereof cooperate with each other to set up, in pulse cable 48, a succession of electrical pulses at a frequency equal to the rate at which the magazine folds actuate the star wheel 15. It may be noted that the generator 47 must have a very low mass inertia because its star-wheel operated parts are moved very rapidly by the slight force exerted through star wheel 15. Inertia is not a design factor in the generator 34 shown because it is positively driven by a mechanically powered mechanism.

From the foregoing, it will be seen that the counter resetting star wheel 15 acts, through the resetting impulse generator 47, to control the resetting of the counter 33 in a manner such as to cause the counter 33 to measure the size of each fold spacing encountered by the star wheel in terms of counts.

Interception at magazine delivery point

The stream of magazines discharging from the conveyor system 9 at the (mail room) delivery point continues to flow onto one platform 10A so long as small in-group fold spacings are being measured. When the count reaches a predetermined value higher than the maximum in-group fold spacing and lower than the minimum between-group fold spacing, the counter 33 operates, through line 50, to actuate the interception means to cause the foot 10 of the ready platform 10B to swing through the discharging stream of magazines at a point corresponding to the between-group fold spacing which is responsible for the large count. In other words, when this large count is reached, the reset counter 33 energizes (through line 50) the latch release means 16 to unlatch the tilted platform and thereby render the bias means 17 operative to snap that platform into its operative position. At the same time, the platform conveyor drive means 18 is rendered operative to move the platform conveyor long enough to bring the next platform into its tilted ready position.

Operation

In operation, we will assume: that the magazine laydown tends to establish an in-group fold spacing averaging 2″ and varying from 0″ to 4″; that the delay means, at and adjacent to the laydown interceptor, operates to establish accurately counted groups of 25 magazines with a between-group fold spacing averaging 10″ and varying from 8″ to 12″; that the press is operating at the 36,000 magazines per hour rate delivering ten magazines per second with the stream conveyor system traveling at 100 feet per minute or 2″ per each ⅒ of a second; and that the pulse rate of the counting impulse generator 34 provides four equally spaced pulses during each 2″ of conveyor travel.

FIG. 5 is intended to show the relationship between the counting pulse frequency in line 44, the reset pulse frequency in line 48, the speed of travel of the stream conveyor system 9 and the size of in-group and between-group fold spacings. For example, FIG. 5 illustrates a succession of two counted groups of magazines comprising preceding group A and succeeding group B. The vertical lines 60 designate a succession of counter actuating counting pulses while the spaces 61 between successive pulses 60 represent both the time interval (.025 second) between pulses and the ½″ of conveyor travel which takes place during that time.

With this understanding, it will be seen that when the fold 62 of the first magazine of group A strikes the star wheel 15, it will operate through pulse generator 47 to send a resetting pulse through line 48 to reset the counter 33 to zero. Since the spacing between the folds of the first and second magazines, as illustrated, equals 2″, which corresponds to four counting pulses, the pulse generating means 34 will generate four counting pulses 1, 2, 3 and 4 and send them through line 44 to the counter 33. The latter will count 1, 2, 3, but, on the fourth pulse, the fold of the second magazine will strike (and thus actuate) the star wheel 15 causing it to reset the counter to zero rather than permit it to count the fourth pulse. In like fashion, an in-group fold spacing of the size shown between the second and third folds, will permit generator 34 to transmit six counting pulses through line 44 to the counter 33 and the latter will count the first five pulses and be reset at the time of the sixth counting pulse by a reset pulse coming from generator 47 through reset line 48. Similarly the spacing between the third and fourth folds will provide four pulses or counts through 34 followed by a reset pulse through 47. The fold 63 of the fifth magazine, however, is not accessible to the star wheel; hence, the star wheel 15 will be actuated only by the fold of the sixth magazine. From this it will be clear that as the magazines of group A continue to discharge from the conveyor 9 at the delivery point, the star wheel 15 never permits the counter 33 to count more than 8 since the maximum spacing, between the folds in group A, does not exceed 4".

After the counter 33 is reset by fold 65 of the 25th magazine of group A, the star wheel will begin its measurement of the fold spacing between groups A and B. As illustrated, such spacing is 8" or 16 counting pulses long. In measuring this 8" spacing, the counter will count up to 15 during the first 7½" of travel. In the last ½" of travel, the star wheel 15 engages the first fold 66 of the first magazine of group B and acts through 47 and 48 to reset the counter to zero.

Between the last fold 65 of group A and the first fold 66 of group B, the group interceptor must operate. The 8" spacing between groups A and B is intended to be the minimum of all between-group spacings. Accordingly, at some count after the count of 8, which corresponds to the 4" maximum in-group fold spacing, and before the count of 16, which corresponds to the 8" minimum of the between-group fold spacings, the counter 33 is arranged automatically to act through line 50 to operate the latch release means 16 (which may be a solenoid coil) and thereby unlatch the tilted platform 10B which is in the ready position.

When this occurs, the bias means 17 will snap that tilted platform 10B so that its foot swings through the discharging stream of magazines at a point between folds 65 and 66, which corresponds to the "interception count." In so doing, it moves into an operative magazine receiving position in time to receive the first magazine of group B. Contemporaneously with the operation of the bias means 17, the platform conveyor drive means 18 will become operative to institute the movement of the platform conveyor 12 and to continue its movement until the next platform enters the upper rear zone and is tilted into and latched in its ready position.

RESETTING IMPULSE COUNTER

While electronic counters, such as counter 33, are well known in the art, it may be helpful to note that I have obtained good results with a "Veeder Root Digital Counter," Series A–180402–T, which was modified to replace its manual reset with an electronic reset. The modified counter 33 is schematically illustrated by the block diagram of FIG. 7.

Counting means

In this diagram, the counter 33 receives counting impulses from generator 34 via input cable 44. An input pulse is amplified at 70, fed into a monostable multivibrator 72 which, during the time it receives the counting impulse from amplifier 70, operates to discharge an impulse into pulse former 74. This pulse former 74 functions to reshape the pulse and then feed it into glow transfer counter tube 76, which cooperates with a count selector switch 78, to count impulses in multiples of one from 1 through 10. This combination of tube 76 and selector switch 78 is normally set by a dial (not shown) which is commonly called a "units dial" or a "ones dial."

The glow transfer counter tube 76 has a series of 10 electrodes (not shown) while the selector switch 78 has a series of 10 switch outlets (not shown). This "ones combination" of tube 76 and switch 78 can be set at any desired count from 0 to 9 by connecting the corresponding switch outlet of switch 78 to the AND gate 80. For example, it may be set for a count of 6 by connecting the AND gate 80 to switch outlet #6 of selector switch 78.

To accommodate counts in excess of 10, the pulse former 74 is connected through another monostable multivibrator 82, and another pulse former 84 to another glow transfer counter tube 86, which cooperates with another count selector switch 88 to count impulses in multiples of tens from 1 through 10. With this arrangement, where a count of more than 10 but not more than 20 is desired, as for example a count of 16, the "tens combinations" is set at 1 to provide a 10 count and the ones combination is set at 6 to provide a 6 count so that both combinations cooperate to provide a count of 16.

The tens switch 88 is also connected to the AND gate 80. In turn, the gate 80 is connected through another monostable multivibrator 90 and amplifier 92 to an output relay 94 which, when energized, will effect the energization of interceptor pulse cable 50 and latch release means 16 to permit the ready platform 10B to snap into its intercepting position.

Reset means

In the FIG. 7 diagram, the manual reset means is replaced by the reset generator 47 and a free running multivibrator 96. The counter 33 receives resetting impulses from generator 47 through line 48. An incoming reset impulse is fed into a free running multivibrator 96, which, in the small fraction of a second during which it receives the reset impulse, generates positive and negative pulses of relatively high frequency, say of the order of 15,000 cycles per second. These pulses are amplified at 98, the positive pulses rejected at phase shift 100 and the negative pulses fed into the counter tubes 76 and 86 to reset both of them to zero and thereby prevent the count from going any higher than it was.

Operation of the resetting impulse counter

We assume: (1) that the counter has just been reset to zero as a result of the actuation of the star wheel 15 by the fold of the last magazine in group A on platform 10A; (2) that the intercept count is set at 16; and (3) that the star wheel 15 is just entering the large spacing between the folds of said last magazine and of the first magazine in the approaching group B, with the count still at zero.

With these assumptions, it will be appreciated that, when the star wheel 15 has traversed the first half inch of said between-group spacing, generator 34 will send a counting pulse into counter 33 to energize the first electrode of tube 76 but nothing happens because, since the count is set at 16, the ones dial must be set at 6; hence, only selector switch 78–6 (i.e. switch outlet #6 of the count selector switch 78) is operative. The same will be true as to the next four counting impulses.

However, at the end of three inches of magazine conveyor travel, impulse #6 will pass through selector switch 78–6 and energize the AND gate 80. But again nothing further happens because that gate has not been energized by an impulse from selector switch 88, the tens dial which is set at 1, so as to require a 10 count before it is operative to energize the gate.

With the next (or 7th) impulse, gate 80 will be completely deenergized. When the 10th counting impulse is received, a corresponding impulse is fed into the first electrode of tube 86. Since selector switch 88 is set at 1, that impulse will be fed through 88–1 to gate 80 and hold gate 80 in a ready condition.

When the star wheel 15 completes its traverse of the first 8" of the said between-group spacing, the 16th impulse will be generated. It will energize electrode #6; hence, an impulse will pass through selector switch 78–6 into the AND gate 80. Since that gate stands in a ready condition, as a result of its previous energization through selector switch 88–1, the gate will permit 90, 92 and 94 to be energized so that an intercepting pulse is fed to unlatch platform 10B and to energize the platform conveyor to remove the bundle formed by magazine group A and replace it with the ready platform.

After the 16th count, the generation of counting impulses and the counting operation continues until the star wheel 15 encounters the first fold of magazine group B. Consequently, if the between-group spacing is 12 inches, the count will proceed to 24. At this point, the star wheel 15 is engaged and turned one-fifth of a revolution causing resetting impulse generator 47 to generate a resetting impulse. This impulse results in the operation of 96, 98 and 100 and the resetting of tubes 76 and 86 to zero. Their dial settings remain the same; hence, the 16 count starts all over again.

Having described my invention, I claim:

1. A method for controlling the actuation of a device for intercepting and separating one group of relatively-flat, rectangular paper products (of uniform length, width and thickness, such as newspapers, magazines and cardboard blanks), from a succeeding group in a traveling stream of said products in spaced overlapping relationship wherein the "between-group" spacing of their advancing edges is substantially greater than the "in-group" spacing of their advancing edges, comprising:
    (A) operating a counting device of the reset type to count at a controlled rate;
    (B) resetting that counter in accordance with the size of successive advancing edge spacings so as to restrict said count to small values for said small in-group edge spacings, and to large values for said large between-group edge spacings; and
    (C) intercepting the first paper of each group in response to counts of a value between said large and small values.

2. An apparatus for controlling the actuation of a device for intercepting and separating one group of relatively-flat, rectangular paper products (of uniform length, width and thickness, such as newspapers, magazines and cardboard blanks), from a succeeding group in a traveling stream of said products in spaced overlapping relationship wherein the "between-group" spacing of their advancing edges is substantially greater than the "in-group" spacing of their advancing edges, comprising:
    (A) counting means operative to count at a controlled rate which is fast enough to provide small and large counts as the stream travels over distances corresponding to the in-group and between-group spacings, respectively, of their advancing edges;
    (B) reset means operative, in response to the passage of successive advancing edges, to reset the counting means to zero and thereby restrict the count to small values for within-group spacings and to large values for between-group spacings; and
    (C) means responsive to counts of intermediate value, occasioned by the large spacing between a given first group and the next following group, to actuate said device and thereby intercept said following group to separate said first group therefrom.

3. The means of claim 2 wherein said counting means includes:
    (A) an impulse counter; and
    (B) means feeding counting impulses to said counter at a rate which is controlled by and varies with the speed of said stream.

4. The means of claim 2 wherein said reset means includes:
    (A) a step-by-step mechanism positioned to be successively engaged by the advancing edges of successive products and to be advanced in step-by-step fashion through such engagement; and
    (B) means for feeding the counter with counter-resetting impulses in response to each engagement.

5. In an apparatus having a conveyor system for conveying a stream of overlapping magazines from a fly wheel laydown and for delivering said stream at a delivery point in groups having small in-group fold spacings and larger between-group fold spacings and a device operative, when actuated, to intercept and separate one group from another, an improved means for controlling the actuation of said device comprising:
    (A) counting means operative to count at a frequency fast enough to provide small and large counts as the stream travels over distances corresponding to said small in-group and larger between-group fold spacings, respectively;
    (B) reset means for restricting the operation of the counting means to small counts in response to in-group fold spacings and to large counts in response to between-group fold spacings; and
    (C) means operating in response to counts of a predetermined intermediate value, to actuate said intercepting device to intercept a group as it reaches the delivery point and separate it from the immediately preceding group.

No references cited.

FRANK E. BAILEY, *Primary Examiner.*